United States Patent [19]
Rhodes

[11] Patent Number: 6,038,768
[45] Date of Patent: Mar. 21, 2000

[54] METHOD AND APPARATUS FOR COUPLING PANEL BOARDS AND TUBING TO A HEADER PIPE

[75] Inventor: Richard O. Rhodes, San Francisco, Calif.

[73] Assignee: FAFCO, Incorporated, Redwood City, Calif.

[21] Appl. No.: 09/094,187

[22] Filed: Jun. 9, 1998

[51] Int. Cl.[7] .................................................. B23P 15/26
[52] U.S. Cl. ............................... 29/890.043; 29/890.033
[58] Field of Search ...................... 29/890.033, 890.043, 29/525

[56] References Cited

U.S. PATENT DOCUMENTS

| | | | |
|---|---|---|---|
| 4,382,468 | 5/1983 | Hastwell | 29/890.033 |
| 4,598,450 | 7/1986 | Thompson et al. | 29/890.033 |
| 5,150,520 | 9/1992 | DeRisi | 29/890.043 |
| 5,407,004 | 4/1995 | DeRisi et al. | 29/890.043 |

*Primary Examiner*—Irene Cuda
*Attorney, Agent, or Firm*—Beyer & Weaver, LLP

[57] ABSTRACT

Methods and apparatus for coupling heat exchange tubing to header pipes which include flanges are disclosed. Heat exchange tubing may generally be coupled, or bonded, to header pipe arrangements in order to produce heat exchanging devices which may be used in solar heating systems and thermal energy storage (TES) devices. According to one aspect of the present invention, a method for forming a heat exchanging device includes pretreating the ends of the heat exchange tubes used in the device. The pretreated ends are then heated to at least partially melt the pretreated ends. At the same time, heat is also applied to the header pipe arrangement included in the device to at least partially melt a flange arrangement which is a part of the overall header pipe arrangement. The pretreated ends of the heat exchange tubes are then sealed against the header pipe arrangement.

14 Claims, 6 Drawing Sheets

METHOD AND APPARATUS FOR COUPLING PANEL BOARDS AND TUBING TO A HEADER PIPE

BACKGROUND OF THE INVENTION

1. Field of Invention

The present invention relates generally to methods and apparatus for use in welding panel boards and tubing to header pipes. More particularly, the present invention relates to methods and apparatus for welding solar panel boards and thermal heat exchanger tubing to header pipes.

2. Background

As the efficient use of energy becomes more of a concern, the use of solar energy heating systems is becoming increasingly popular. The use of thermal energy storage (TES) systems, in particular, is becoming more prevalent. TES systems enable lower cost energy, e.g., electricity during off-peak demand hours, to be used, for example, to freeze ice which may be melted during peak hours to thereby provide cooling capabilities without significant usage of electricity during peak demand hours.

Heating systems which use solar energy are typically arranged to capture solar heat and to store the solar heat until the heat is needed. One particularly efficient solar heating system captures solar heat for use in heating swimming pools. FIG. 1a is a diagrammatic representation of a solar heating panel which is suitable for use in heating a swimming pool. Solar heat is captured by solar heating panel 102 using an array of heat exchange tubes 104 which are preferably made of a dark, thermoplastic material. Heat exchange tubes 104 are oriented such that heat exchanges tubes 104, as for example heat exchange tubes 104a and 104b, are adjacent to each other. Further, adjacent heat exchange tubes 104 are "attached" such that heat exchange tubes 104 form a panel board 108, as shown.

Water generally runs through header pipes 110, which are made of a thermoplastic material, and heat exchange tubes 104. The water is typically warmed as it passes through heat exchange tubes 104. That is, solar heat that is captured by heat exchange tubes 104 is used to warm water as water flows through heat exchange tubes 104. As shown, caps 112 are included at the ends of header pipe 110 for interconnection purposes. Caps 112 are often fabricated from a material which prevents creep from occurring in header pipe 110. Through caps 112, a pump or other water supply mechanism is generally coupled to header pipe 110 to enable water to be run through heat exchange tubes 104. Additional solar heating panels 102 may be connected together, effectively in parallel, in order to form larger solar heating systems.

TES systems are typically arranged to use electricity at off-peak energy demand periods to "store" energy for use at a later time, as mentioned above. That is, electricity is used when the cost of electricity is lower to produce and store energy which may be used when the cost of electricity is higher. Heat exchangers are generally included as a part of a TES system. In particular, cooling liquid, e.g., a glycol solution, may be pumped through a heat exchanger to store energy in a thermal energy storage medium, which is typically in the form of either a low-temperature fluid or a solid such as ice, and is in contact with the heat exchanger. Then, at a later time, glycol solution is pumped through heat exchangers in the thermal energy storage medium to produce chilled air for cooling purposes, as will be appreciated by those skilled in the art. For example, the chilled air may be used as a part of an air-conditioning system that is arranged to cool a building.

FIG. 1b is a diagrammatic representation of heat exchanger that may be part of a TES system. Like the solar heating system described above with respect to FIG. 1a, heat exchanger 120 includes header pipes 124 and heat exchange tubes 128. Heat exchange tubes 128 are arranged in an array such that heat exchange tubes 128 are substantially parallel and adjacent to one another. Within heat exchanger 120, distal ends of heat exchange tubes 128 are attached to header pipes 124. In general, heat exchange tubes 128 are made of a dark, thermoplastic material. Caps 130 are generally attached to the ends of header pipes 124 to permit connections between multiple header pipes, and to prevent creep in header pipes 124, as mentioned above. Caps 130 may also be configured to facilitate the coupling of header pipes 124 with a pump or similar supply mechanism which allows cooling fluid to be pumped through header pipes 124 and heat exchange tubes 128.

Coupling heat exchange tubes to header pipes typically involves a combination of welding and melting processes. In general, a panel board, i.e., an array of adjacently connected heat exchange tubes, is welded directly to a header pipe, or pretreated to create a flange surface which may be used to attach the panel board to a header pipe. FIG. 2a is a diagrammatic representation of a portion of a panel board prior to the formation of a flange. A panel board 202 includes a plurality of tubes 204, which are generally thermoplastic tubes. Tubes 204 include openings 208 which pass through ends 212 of tubes 204. In other words, tubes 204 are not sealed at ends 212.

Ends 212 are typically pretreated to melt tubes 204 in the vicinity of ends 212. This pretreatment of ends 212 often involves heating ends 212, e.g., using hot air, and forming the required flange in a mold, typically by cooling ends 212 in the mold. As such, creating a surface which may be coupled to a header pipe generally involves separate pretreatment and cooling processes. Alternatively, a single die, which is first heated for the pretreatment, then cooled to create the flange surface from pretreated ends 212, may be used.

FIG. 2b is a diagrammatic representation of panel board 202 of FIG. 2b after ends 212 have been pretreated and formed in a mold. As will be appreciated by those skilled in the art, machinery that is used to create a flange at the end of a panel board of thermoplastic tubes typically requires significant adjustments when the width of the panel board changes. By way of example, when the width of the panel board is to be changed, a thermoforming die that is specific for the width of the panel board must be installed in the machinery. Maintaining a full complement of thermoforming dies to accommodate different widths of panel boards is expensive, while having to make significant adjustments to machinery each time a different panel board width is to be used is inefficient.

A flange 220 is created at pretreated ends 212 from melted material, i.e., the thermoplastic material at and in the vicinity of the original ends of panel board 202, as shown in FIG. 2a. In general, a significant amount of material must be melted in order to create flange 220. Flange 220 is arranged to be sealed against a header pipe to form, for example, either a solar panel board or a heat exchanger. The creation of flange 220, however, may result in tubes 204 being substantially sealed or "pinched off." In other words, flange 220 may substantially block off tubes 204 such that openings 208' are significantly smaller than the openings in tubes 204 prior to the formation of flange 220. Often, openings 208' are essentially non-existent.

Alternatively, pretreated ends 212 may be welded directly to header pipe 248. When pretreated ends 212 may be welded directly to header pipe 248, tubes 204 are plugged by the wall of header pipe 248. As such, each tube must be drilled open in order to accommodate fluid flow.

With openings 208' either being non-existent or of a significantly smaller size than desired, openings 208' must be enlarged in order to permit fluid to flow through tubes 204 without a significant drop in pressure once a solar panel board or a heat exchanger is created from panel board 202. Therefore, openings 208' are enlarged or, in some cases, created, by any process which essentially removes material from flange 220 in the areas where openings 208' are desired. Such processes are typically time-consuming, and generally include the use of pin-like shafts which are heated and are arranged to push through thermoplastic material. Other processes may include drilling process used to drill through thermoplastic material. The processes used to enlarge openings 208' through flange 220 may also cause debris, e.g., the material which was obstructing openings 208', to enter tubes 204.

Once openings 208' of an acceptable size are created, panel board 202 is considered to be ready to be coupled to a header pipe. FIG. 2c is a diagrammatic representation of a header pipe and the panel board of FIG. 2b, with properly sized openings, which is arranged to be coupled to the header pipe. A header pipe 248 includes flow openings 250 which are arranged to be aligned with a sub-header channel 260, or sub-header, which distributes flow to each opening 208". Once openings 250 are suitably aligned with openings 208", then flange 220 and at least the portion of header pipe 248 that will be coupled to flange 220 are heated. Typically, header pipe 248 and flange 220 are heated to their respective melting point temperatures. Such heating is often performed using an infrared heat source, or a heated platen. Once the melt point temperatures are reached, header pipe 248 and flange 220 are often pressed together. Alternatively, panel board 202 and header pipe 248 may be welded after heating. The welding after heating may occur without flange 220, in which case openings 208" and 250 must effectively be aligned.

After panel board 202 and header pipe 248 are assembled, other processes associated with the fabrication of a solar heating system or a heat exchanger are also typically performed. By way of example, caps are often added to the ends of the header pipes to prevent creep from occurring in the header pipes and to allow multiple panel boards to be coupled together. Also, in order to create a heat exchanger like the heat exchanger described above with respect to FIG. 1b, after a panel board is assembled to header pipes, the tubes in the panel board must be manually separated. Although having to manually separate tubes is time-consuming and, hence, inefficient, the above described processes used to couple header pipes with the flange and panel boards may not be readily used to couple a series of individual tubes to header pipes. Flanges created on individual tubes often leak, and are both difficult to handle and difficult to align.

As demand for solar heating systems and TES systems increases, reducing the number of process steps associated with the fabrication of such systems would increase the production of such systems. For example, reducing the number of process steps associated with coupling panel boards to header pipes would enable the efficiency of the overall fabrication process to be increased. Further, allowing process steps to be readily adapted to panel boards of different sizes would also increase the efficiency with which the fabrication process may occur. In addition, eliminating inefficient processes would reduce the overall costs associated with producing solar heating systems and TES systems. Therefore, what is desired are methods and apparatus for efficiently coupling header pipes to heat exchange tubes.

SUMMARY OF THE INVENTION

Methods and apparatus for coupling heat exchange tubing to header pipes which include flanges are disclosed. Heat exchange tubing may generally be coupled, or bonded, to header pipe arrangements in order to produce heat exchanging devices which may be used in solar heating systems and thermal energy storage (TES) devices. According to one aspect of the present invention, a method for forming a heat exchanging device includes pretreating the ends of the heat exchange tubes used in the device. The pretreated ends are then heated to at least partially melt the pretreated ends. At the same time, heat is also applied to the header pipe arrangement included in the device to at least partially melt a flange arrangement which is a part of the overall header pipe arrangement. The pretreated ends of the heat exchange tubes are then sealed against the header pipe arrangement. Specifically, the pretreated ends of the heat exchange tubes are sealed against the header pipe within the flange arrangement.

In one embodiment, pretreating the ends of the heat exchange tubes includes melting the ends of the heat exchange tubes, and pressing the ends of the heat exchange tubes against a flat surface in order to thicken the ends of the heat exchange tubes. In such an embodiment, since each heat exchange tube includes an opening which traverses substantially the entire length of the tube, the ends of the heat exchange tubes are thickened while the integrity of the openings in each of the heat exchange tubes is substantially preserved.

In accordance with another aspect of the present invention, a method for coupling a plurality of tubes to a header which has flanges includes heating the flanges such that the flanges at least partially melt. The end of each tube is also heated until the portions of the tube near the end of the tube are at least partially melted. Finally, the heated end of each tube is rapidly pressed against the header pipe to seal the tubes to the header pipe. When the tubes are sealed against the header pipe, the tubes are also sealed between the flanges. In one embodiment, the method also includes thickening the end of each tube before the end of each tube is heated.

In another embodiment, the header includes holes which are located between the flanges. Since the tubes also have openings, the openings in the tubes may be aligned with the holes in the header. Aligning the openings with the holes allows water to flow between the header and the tubes.

These and other advantages of the present invention will become apparent upon reading the following detailed description and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Solar heating systems and thermal energy storage (TES) systems may often include arrangements of thermoplastic heat exchange tubes which are coupled to header pipes. The fabrication of such solar heating systems and TES systems typically requires a relatively large number of process steps. Reducing the number of process steps associated with the overall fabrication of solar heating systems and TES systems would improve the efficiency of the fabrication process, thereby increasing the production of such systems. By way of example, reducing the number of steps associated with coupling heat exchange tubes to header pipes would enable the efficiency of the coupling process and, hence, the overall fabrication process, to be increased. The steps associated with coupling heat exchange tubes to header pipes generally include melting the ends of the heat exchange tubes to form flange surfaces, and defining, or redefining, openings in the flange surfaces.

The need to create a flange surface at the ends of tubing such as heat exchange tubes may be eliminated by extruding flanges on a header to which the heat exchange tubes are to be coupled, in lieu of creating flange surfaces on the heat exchange tubes. Flanges may be extruded on header pipes using a single die that is arranged to extrude both the header pipe and the flanges. By extruding flanges on header pipes, the machinery or, more specifically, the array of dies needed to create flange surfaces on heat exchange tubes may be eliminated. In addition, the need to enlarge or create openings in the flange surfaces to permit fluid to flow through the heat exchange tubes will no longer be necessary, resulting in less flow restriction at the flange area and less pressure drop. Therefore, by eliminating the processes directly associated with the creation of flanges on heat exchange tubes, the overall process of coupling heat exchange tubes to headers is faster and, hence, more efficient.

Figure 1A:
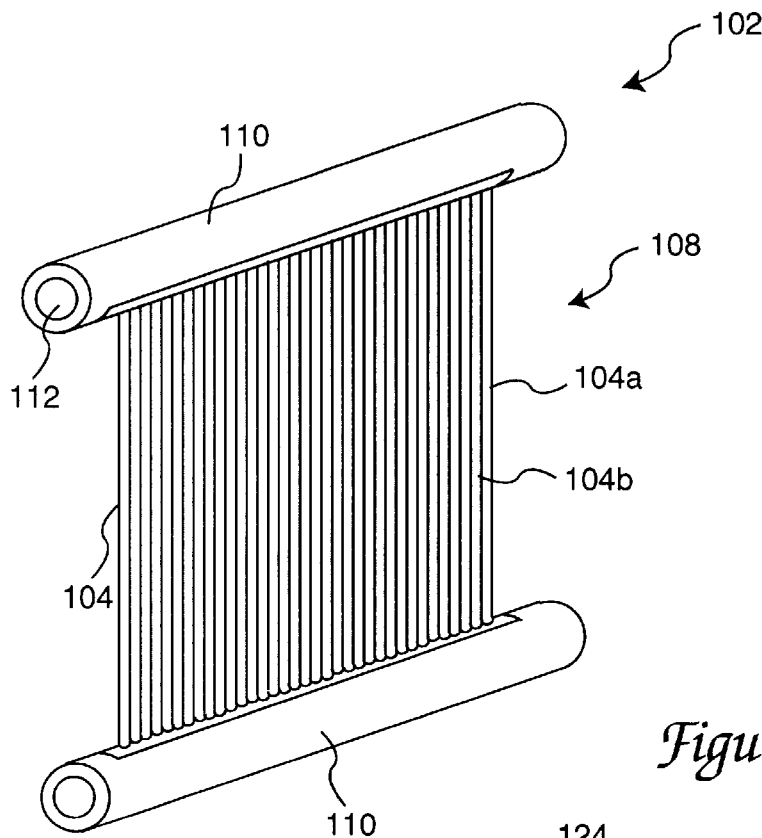
FIG. 1a is a diagrammatic representation of a solar heating system which is suitable for use in heating a swimming pool.
Figure 1B:
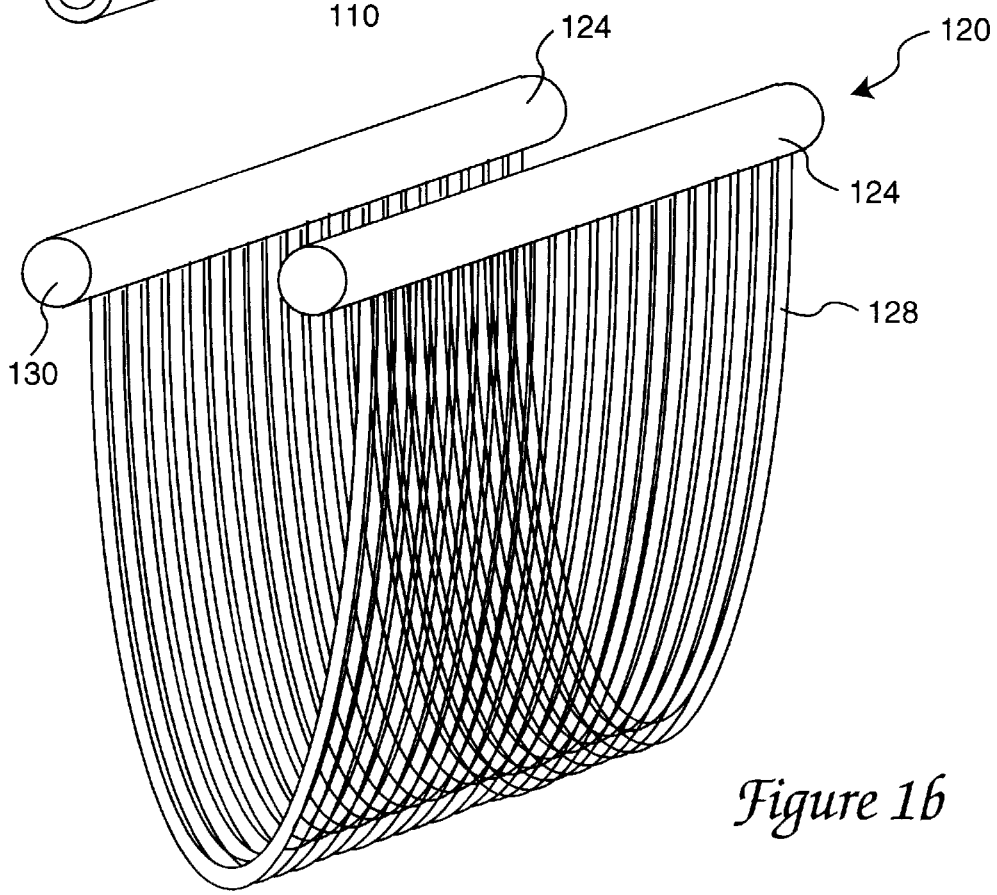
FIG. 1b is a diagrammatic representation of heat exchanger that may be part of a TES system.
Figure 2A:
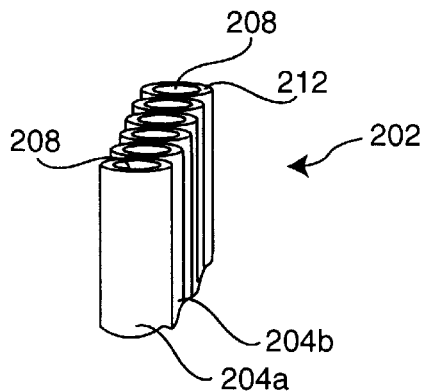
FIG. 2a is a diagrammatic representation of a portion of a panel board prior to the formation of a flange.
Figure 2B:
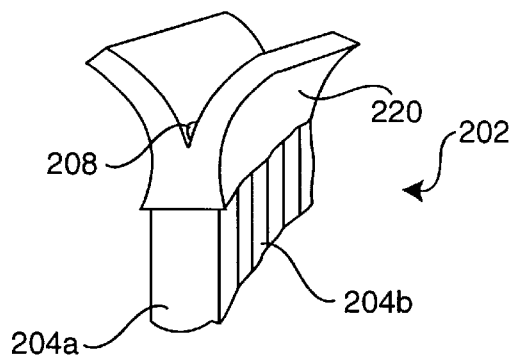
FIG. 2b is a diagrammatic representation of the panel board of FIG. 2b after ends of heat exchange tubes have been pretreated and formed in a mold.
Figure 2C:
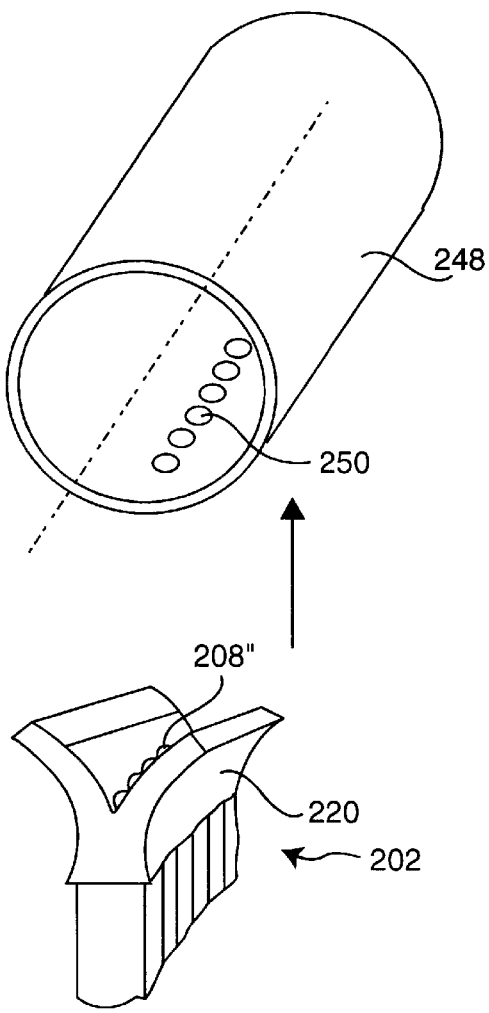
FIG. 2c is a diagrammatic representation of a header pipe and the panel board of FIG. 2b, which is to be coupled to the header pipe.
Figure 3A:
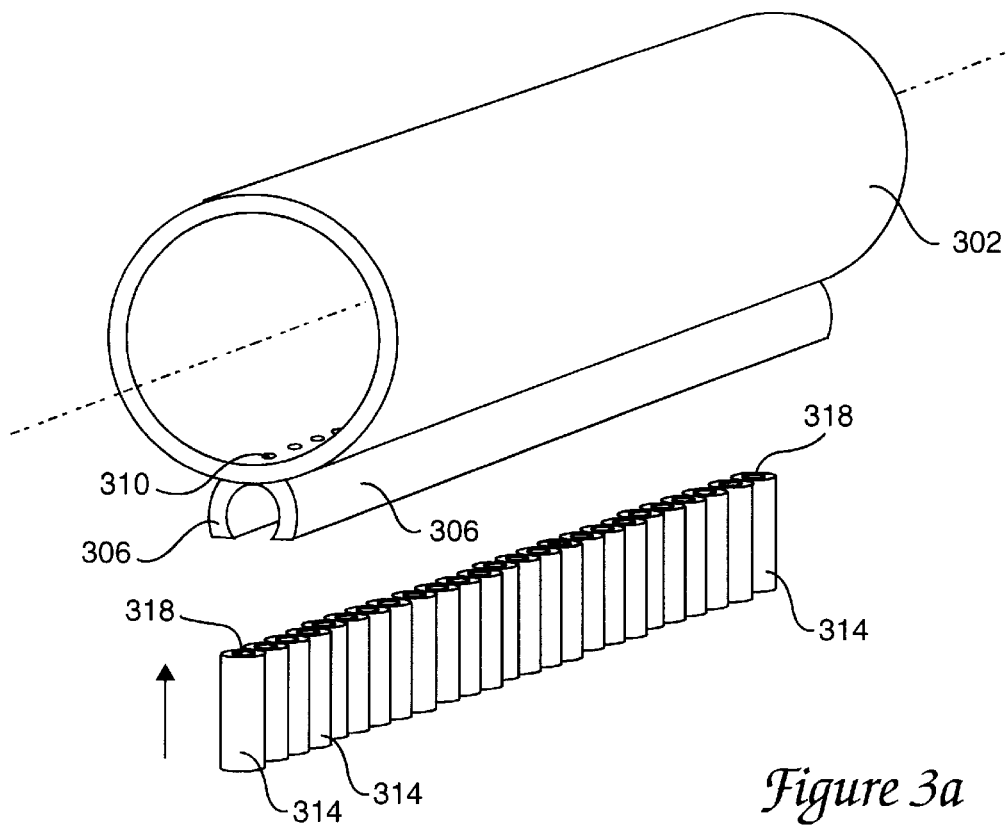
FIG. 3a is a diagrammatic representation of a header pipe, which includes flanges, and a portion of a panel of heat exchange tubes in accordance with an embodiment of the present invention.

FIG. 3a is a diagrammatic representation of a header, or, more specifically, a header pipe, and a portion of a panel of heat exchange tubes in accordance with an embodiment of the present invention. A header pipe 302, which may be made from any suitable material such as polypropylene, includes flanges 306. In general, flanges 306 are formed on header pipe 302 using an extrusion process, although for relatively short pipe sections, injection molding may also be used. As shown, flanges 306 are "curved" sections of polypropylene, or substantially any other suitable thermoplastic material, although it should be appreciated that flanges 306 may take on any suitable configuration. By way of example, in one embodiment, flanges 306 may have a substantially straight configuration.

Figure 3B:
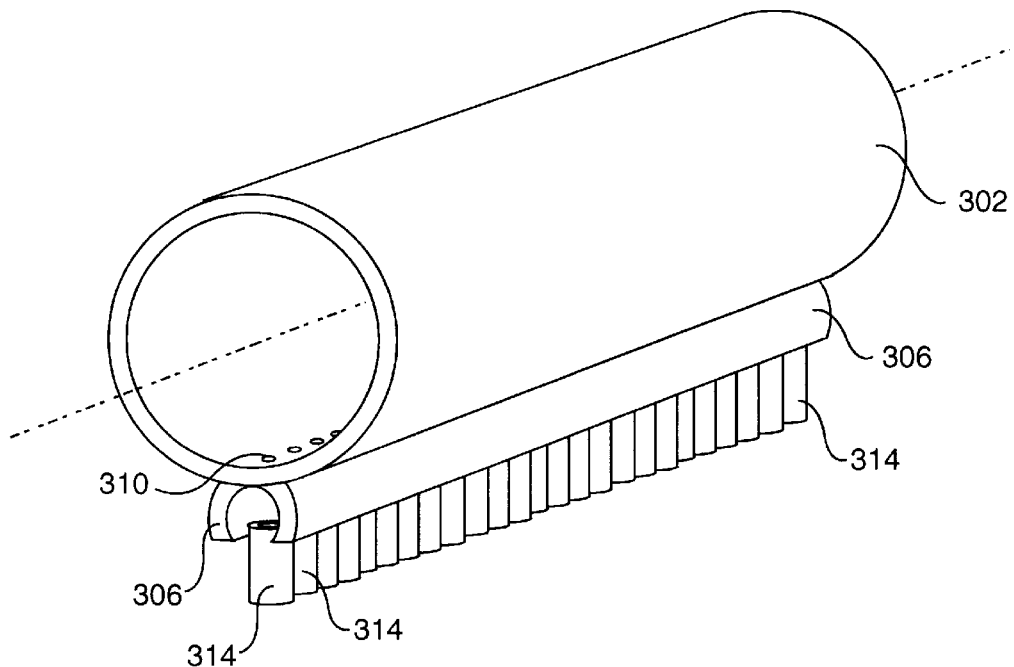
FIG. 3b is a diagrammatic representation of the header pipe of FIG. 3a after heat exchange tubes are sealed against the header pipe in accordance with an embodiment of the present invention.

Sub-header holes 310 are included in header pipe 320 such that sub-header holes 310 are positioned along header pipe 320 "between" flanges 306. The positioning of sub-header holes 310 between flanges 306 enables openings 318 in heat exchange tubes 314 to communicate with at least some of sub-header holes 310 when tubes 314 are effectively located against flanges 306, as shown in FIG. 3b. When sub-header holes 310 communicate with openings 318, water, or any other fluid, may flow through tubes 314 via header pipe 302.

Tubes 314 may generally be a part of an overall panel board, i.e., tubes 314 may be coupled together. Alternatively, in one embodiment, each tube 314 may be an individual pipe. In other words, tubes 314 may be separated from one another. Tubes 314 which are separated from one another are particularly suitable for use in TES systems, while tubes 314 which are a part of an overall panel board are particularly suitable for use as solar panel boards.

Generally, the sizes of header pipe 302, tubes 314, and flanges 306 may be widely varied depending upon the needs of a particular systems. In one embodiment, header pipe 302 may have an outer diameter in the range of approximately 2 inches to approximately 3 inches, and an inner diameter in the range of approximately 1.6 inches to approximately 2.7 inches. Tubes 314 may have substantially any suitable length, and may also have any suitable outer diameter, e.g., an outer diameter which is in the range of approximately 0.2 inches to approximately 0.5 inches. Although the length of tubes 314 may generally be widely varied, tubes 314 have been shown as being relatively short for purposes of illustration. The overall size of flanges 306 is typically dependent upon the size of header pipe 302 and the size of tubes 314. By way of example, for an embodiment in which header pipe 302 has a outer diameter of approximately 2.4 inches and tubes 314 have an outer diameter of approximately 0.25 inches, then flanges may have a thickness of approximately 0.13 inches.

FIG. 3b is a diagrammatic representation of header pipe 302 of FIG. 3a after tubes 314 are sealed against flanges 306. Flanges 306 are sealed to tubes 314, essentially to secure tubes 314 with respect to header pipe 302. The steps associated with sealing tubes 314 against flanges 306 and, more specifically, sealing the ends of flanges 306 against header pipe 302, will be described below with respect to FIG. 5.

Before heat exchange tubes are sealed against a header pipe, the heat exchange tubes may first be treated to essentially thicken the walls of the heat exchange tubes near the ends of the heat exchange tubes. Thickening the walls of the heat exchange tubes may prevent fluid from leaking out of the header pipe, by reducing the size of "leak areas" which are present substantially between adjacent heat exchange tubes.

Figure 4A:
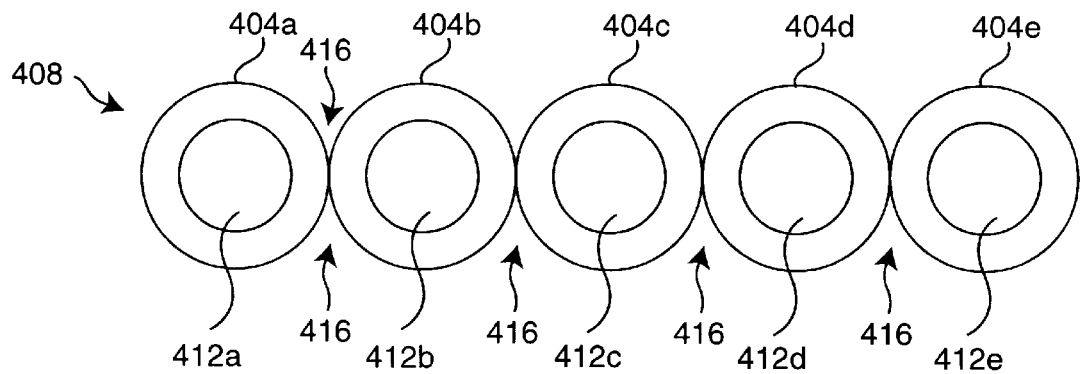
FIG. 4a is a diagrammatic top-view representation of heat exchange tubes prior to exposure to heat in accordance with an embodiment of the present invention.
Figure 4B:
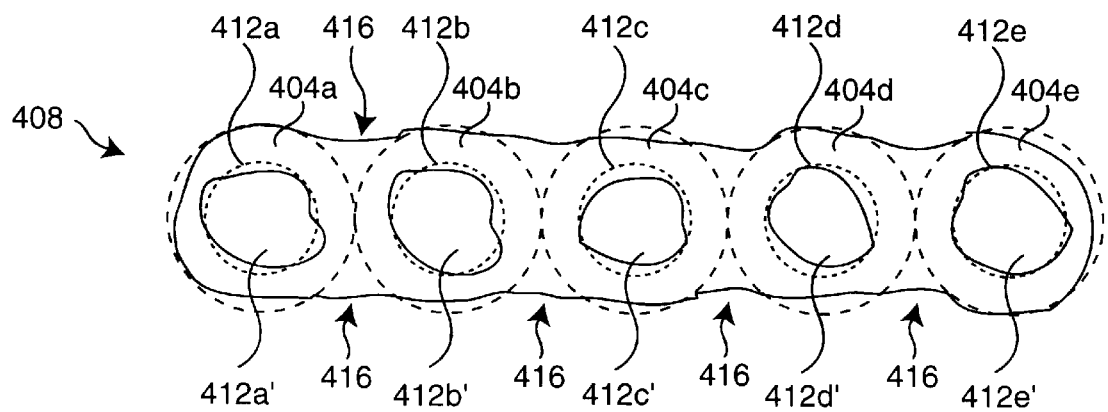
FIG. 4b is a diagrammatic top-view representation of the panel board of FIG. 4a after leak areas have been at least partially thickened in accordance with an embodiment of the present invention.

With reference to FIGS. 4a and 4b, the pre-treatment of heat exchange tubes prior to pressing the tubes against a header pipe will be described in accordance with an embodiment of the present invention. FIG. 4a is a diagrammatic top-view representation of heat exchange tubes prior to exposure to heat in accordance with an embodiment of the present invention. Heat exchange tubes 404, which include openings 412, may be organized as a panel board 408, as described above. In other words, tubes 404 may be arranged such that adjacent tubes, e.g., tubes 404a and 404b, may be coupled, as shown.

When tubes 404 form panel board 408, leak areas 416 are generally formed between adjacent tubes 404. Leak areas 416 are areas which are not readily sealed against a flange of a header pipe, e.g., header pipe 302 of FIG. 3b. Therefore, leak areas 416 are generally located at the ends of tubes 408 where flanges of a header pipe are likely to contact tubes 408. As a result, fluid may leak out of an overall solar heating system or TES system through leak areas 416.

In order to prevent leakage in a solar heating system or a TES system of which panel board 408 is a part, tubes 404 may be treated to essentially eliminate leak areas 416. Treating tubes 404 may, in one embodiment, involve thickening tubes 404 near leak areas 416 to essentially "fill up" leak areas 416. As will be described in more detail below with respect to FIG. 5, the treatment of tubes 404 may involve exposure of tubes 404 to heat, followed by pressing tubes 404 against a surface to thicken the walls of tubes 404.

Generally, substantially another number of "heat and press cycles" may be used to treat tubes 404 such that the walls of tubes 404 are thickened. In other words, the pre-treatment of panel board 408 or the ends of tubes 408 may involve one or more heating and pressing operations. In addition, it should be appreciated that a pressing operation may involve pressing the heated ends of tubes 408 against a flat surface, e.g., a flat platen. Alternatively, the heated ends of tubes 408 may be molded into substantially any desired shape, as for example a rounded shape or a squared shape.

FIG. 4b is a diagrammatic top-view representation of panel board 408 after leak areas 416 have been at least partially filled in accordance with an embodiment of the present invention. The treatment to thicken tubes 404 allows some material, e.g., thermoplastic material, that is a part of tubes 404 to fill in at least a portion of leak areas 416. Hence, with leak areas 416 being at least partially filled in, flanges associated with a header pipe may be more easily sealed against panel board 408 such that leakage through leak areas 416 is essentially eliminated.

The treatment of tubes 404, while allowing thermoplastic material to fill in leak areas 416, generally causes tubes 404 to become partially deformed. In other words, ear the ends of tubes 404, the shape of both tubes 404 and openings 412 in tubes 404 ay be altered. However, as shown, openings 412 are not altered to the extent that distorted openings 412', created from openings 412 during treatment of tubes 404, are essentially sealed up, e.g., non-existent. Therefore, distorted openings 412' do not need to be "hollowed out" prior to coupling tubes 404 to a header pipe.

Figure 5:
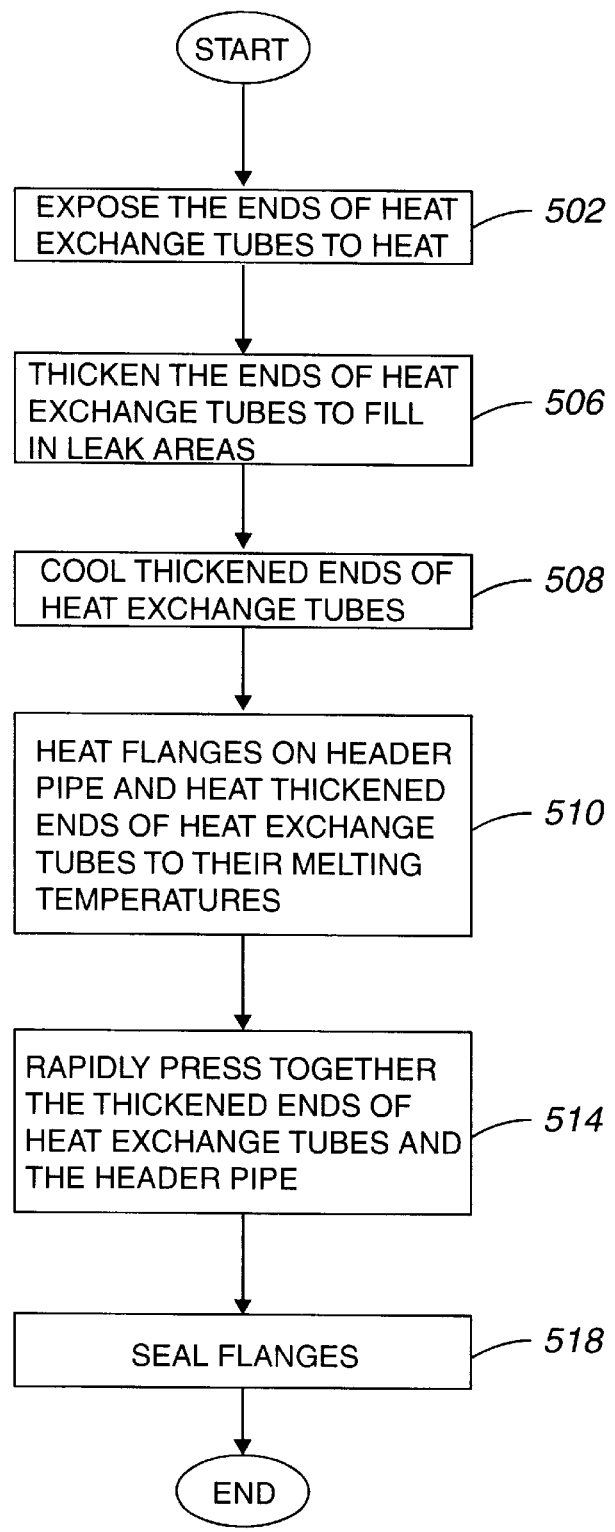
FIG. 5 is a process flow diagram which illustrates the steps associated with welding heat exchange tubes to a header pipe in accordance with an embodiment of the present invention.

With reference to FIG. 5, a method of welding tubes, e.g., heat exchange tubes formed of a thermoplastic material, to a header pipe will be described in accordance with an embodiment of the present invention. The method begins in step 502 in which the ends of heat exchange tubes are exposed to heat. In one embodiment, the heat exchange tubes are coupled to one another such that the heat exchange tubes form a panel board. In another embodiment, heat exchange tubes are individual tubes, as for example tubes which are intended for use in a TES storage system.

The ends of heat exchange tubes may generally be exposed, or subjected, to heat using a variety of different methods. While the methods may be widely varied, the methods include, but are not limited to, exposing the ends of heat exchange tubes to hot air, interfacing the ends of heat exchange tubes with a hot platen or surface, and exposing the ends of heat exchange tubes to infrared heat. In general, the heat, or elevated temperature, that is applied to the ends of heat exchange tubes may depend upon the melting point associated with the heat exchange tubes. By way of example, for heat exchange tubes that are fabricated from a thermoplastic material, the melting point may be in the range of approximately 232 degrees Centigrade to approximately 238 degrees Centigrade, although it should be appreciated that the melting point may generally be widely varied. Accordingly, the elevated temperatures applied to the ends of thermoplastic heat exchange tubes may be in the range of approximately 230 degrees Centigrade to approximately 240 degrees Centigrade.

Like the range of elevated temperatures, the duration of the exposure of the ends of heat exchange tubes to the elevated temperatures may also be widely varied. The duration of the exposure may be dependent on any number of different factors such as the material used to form the heat exchange tubes, the thickness of the walls of the heat exchange tubes, and the overall size of the heat exchange tubes. In general, the length of the heat exposure may range from approximately 10 seconds to approximately 20 seconds, although it should be appreciated that the length may also often be much longer or much shorter.

After the ends of heat exchange tubes are heated in step 502, process flow moves to step 506 in which the ends of the heated heat exchange tubes are thickened. Thickening the ends of heat exchange tubes, as mentioned above with respect to FIG. 4b, allows leak areas which form near the interface between two heat exchange tubes, to be at least partially filled in. In a panel board, leak areas are filled in with melted material from the heat exchange tubes. When heat exchange tubes are separate, and do not form a panel board, the thickening of the ends of the heat exchange tubes enables the ends to be "squared off" to effectively produce a seal between each tube, in addition to filling in leak areas. That is, squaring off the ends of the heat exchange tubes both produces seals between adjacent tubes, and substantially eliminates leak areas.

In one embodiment, the heat exchange tubes are thickened by pressing the ends of the heat exchange tubes against a cooled surface. When the partially melted ends of heat exchange tubes are pressed against a cooled surface, the ends thicken and solidify. While the cooled surface against which the ends of heat exchange tubes are pressed may generally be any suitable die surface, the cooled surface typically has the configuration of a flat platen.

Once the ends of heat exchange tubes are thickened, the thickened ends of heat exchange tubes are allowed to cool in step 508. After the thickened ends of heat exchange tubes are cooled, then in step 510, the flanges on a header pipe to which the thickened ends of heat exchange tubes are to be coupled, as well as the thickened ends of heat exchange tubes, are heated. In the described embodiment, the thickened ends of heat exchange tubes and the flanges are heated to their respective melting points. As previously mentioned, the melting point of a heat exchange tube that is formed from a thermoplastic material is typically in the range of approximately 232 degrees Centigrade to approximately 238 degrees Centigrade. Since the flanges on the header pipe are typically made of a material such as polypropylene, the melting point of the flanges is generally in the range of approximately 230 degrees Centigrade to approximately 240 degrees Centigrade, although the melting point may be widely varied.

When the flanges on the header pipe and the ends of thickened heat exchange tubes are heated to their respective melting temperatures, as desired, the thickened ends of heat exchange tubes are rapidly pressed together with the flange ends on the header pipe. By rapidly pressing heat exchange tubes against the flange while the thickened ends of heat exchange tubes and the flanges ends are still substantially heated to their respective melting points, the heat exchange tubes may essentially be welded to the flange. Specifically, the heat exchange tubes are pressed against the flange such that the flanges on the header pipe may be sealed on the ends of the heat exchange tubes while the ends of heat exchange tubes may be sealed against the flange ends. In one embodiment, as described above with respect to FIGS. 3a and 3b, sub-header openings in the header pipe "communicate" with the openings in the thickened ends of heat exchange tubes while the flange and the thickened ends of heat exchange tubes are pressed together.

In one embodiment, after the heat exchange tubes are sealed against the flange of the header pipe in step 514, then the flanges of the header pipe are sealed in step 518. That is, the ends of the flanges, as well as the ends of the header pipe, are sealed using a cap and, in some embodiments, a coupler which is fabricated from a material that is suitable for preventing creep in the header pipe. It should be appreciated, however, that he ends of the flanges may alternatively be sealed prior to heating the heat exchange tubes to their melting temperatures, i.e., step 518 may instead occur prior to step 510. While any suitable method may be used to seal the ends of the flanges and the header pipe, the ends of the flanges and the header pipe are typically sealed using a cap arrangement, as will be described below with respect to FIGS. 6a and 6b. Once the flanges, and the header pipe, are sealed, then the process of welding heat exchange tubes to a header pipe is completed.

As previously mentioned, both the length of heat exchange tubes and the diameter of the heat exchange tubes may be widely varied. In general, the process of welding heat exchange tubes to a header pipe is readily adapted to tubes of different lengths and diameters. The machinery, or tooling, associated with the welding process typically does not require significant adjustments in order to accommodate different tube lengths and diameters. By way of example, the welding process may be used to weld heat exchange tubes with relatively small diameters, which was difficult using conventional processes. Tubes with relatively small diameters, e.g., diameters of approximately 0.125 inches or less, are particularly useful in that they require less material in fabrication, sustain relatively high operating pressures, and permit relatively high thermal efficiency.

Figure 6A:
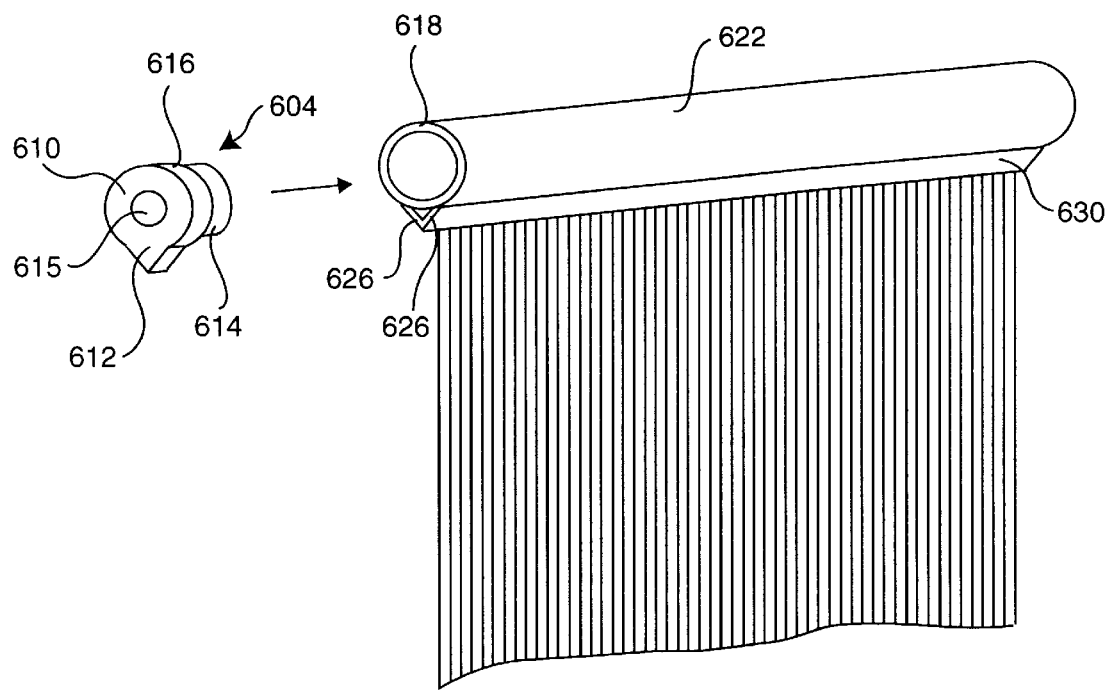
FIG. 6a is a diagrammatic representation of a first suitable cap arrangement which may be inserted into the end of a header pipe to prevent creep in accordance with an embodiment of the present invention.

To seal a header pipe in order to prevent creep in the header pipe, the ends of the header pipe may be capped using a cap-coupler arrangement, as mentioned above. The ends of flanges on the header pipe may also be sealed to prevent leaks. A cap arrangement used to seal header pipes and flanges may take on a variety of different configurations. FIG. 6a is a diagrammatic representation of a first suitable cap arrangement which may be inserted into the end of a header pipe to prevent creep in accordance with an embodiment of the present invention. A cap 604 includes a "pipe cap," or coupler, portion 610 and a "tab" portion 612. In the described embodiment, cap 604 also includes an opening 615 to which a pump, or a water supply, (not shown) may be connected in order to provide fluid flow through cap 604 and into a header pipe 622, when cap 604 is sealed to header pipe 622.

Pipe cap portion 610 is configured such that a plug 614 included in pipe cap portion 610 is inserted into an end 618 of header pipe 622 to allow for insertion and to prevent creep in header pipe 622. An external portion 616 of pipe cap portion 610, as shown, is arranged to remain substantially external to header pipe 622 when plug 614 is inserted in header pipe 622. Tab portion 612 is configured to be seal off ends 626 of flanges 630 when plug 614 is inserted into header pipe 622.

In general, the methods used to seal cap 604 with header pipe 622 and flanges 630 may be widely varied. One suitable method of sealing cap 404 with header pipe 622 and flanges 630 involves heating end 618 of header pipe 622, ends 626 of flanges 630, and cap 604 using infrared heat to promote a bond between cap 604 and both header pipe 622 and flanges 630. Another suitable method involves the use of a platen weld to seal cap 604 with header pipe 622 and flanges 630.

Although cap 604 may be formed from a number of different materials, in one embodiment, cap 604 is fabricated from glass-filled polypropylene. Filling cap 604, which may be formed from polypropylene, with glass is effective in preventing creep from occurring within header pipe 622 when header pipe 622 is subjected to a clamping force, as will be appreciated by those skilled in the art. Typically, any portion of cap 604 may also take on any suitable shape. By way of example, while tab 612 is shown as having a triangular cross-section, tab 612 may also have a substantially rectangular cross-section.

Figure 6B:
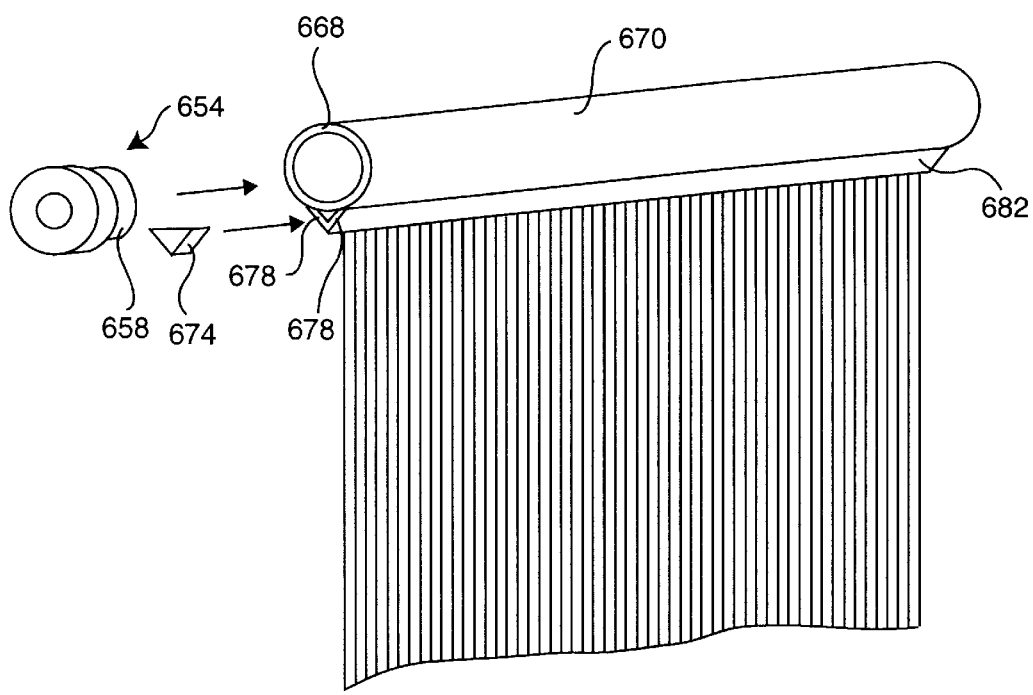
FIG. 6b is a diagrammatic representation of a second suitable cap arrangement which may be inserted into the end of a header pipe to prevent creep in accordance with an embodiment of the present invention.

Another configuration of a cap arrangement which may be used to seal a header pipe and flanges associated with the header pipe includes two separate pieces. FIG. 6b is a diagrammatic representation of a second suitable cap-coupler arrangement which may be inserted into the end of a header pipe to prevent creep in accordance with an embodiment of the present invention. A header connection 654 includes a coupler portion 658 which is arranged to be inserted into an end 668 of a header pipe 670. Header coupler 654 may be a glass-filled polymer such that creep caused by clamps or pipe adapters in header pipe 670 is prevented. In one embodiment, header coupler 654 may be bonded, or otherwise welded, to header pipe 670 using infrared heating. Alternatively, header coupler 654 may be welded to header pipe 670 using a spin-welding process.

A flange cap 674 is arranged to seal ends 678 of flanges 682. While flange cap 674 may take on a variety of different shapes, in the described embodiment, flange cap 674 has a "wedge" shape with a triangular cross-section. Other suitable shapes for flange cap 674 include, but are not limited to, a block with a rectangular cross-section. At least a portion of flange cap 674 may be bonded with ends 678 of flanges 682 to seal ends 678. One method that may be used to bond flange cap 674 with ends 678 is an infrared heating process. In one embodiment, flange cap 674 may be used to seal ends 678 of flanges 682 prior to attaching a panel of header pipes to the flange. However, in other embodiments, flange cap 674 may be used to seal ends 678 of flanges 682 after the header pipes are effectively attached to the flange.

Although only a few embodiments of the present invention have been described, it should be understood that the present invention may be embodied in many other specific forms without departing from the spirit or the scope of the invention. By way of example, the steps associated with coupling heat exchange tubes to a header pipe which includes flanges may be reordered. In addition, steps may be added or removed. One additional step which may be added to the steps associated with coupling heat exchange tubes to a header pipe involves aligning openings in the heat exchange tubes with sub-header openings in the header pipe, as mentioned above with respect to FIGS. 3a and 3b. In one embodiment, aligning sub-header openings may involve aligning the openings in one sub-header such that the openings are slightly offset from the openings in an opposing sub-header. This slight offset allows fluid, such as water, to be fed into heat exchange tubes in an angled, e.g., diagonal, manner, as will be appreciated by those skilled in the art. As such, the slight offset may provide for a more even flow of fluid through heat exchange tubes.

The coupling of header pipes may also include heating flange ends and flange, or end, caps, and pressing the end caps into the flange ends prior to heating the flanges and the ends of the heat exchange tubes. In other words, flange caps may be sealed against flanges before the heat exchange tubes are coupled to the flanges. By sealing flange caps against flanges before the heat exchange tubes are coupled to the flanges, the structure of the flanges is effectively reinforced for the welding process, as will be appreciated by those skilled in the art.

In some cases, in order to prevent potential bowing in a header pipe, the portion of the header pipe that is directly opposite from the flanges may be strengthened or otherwise compensated for. Although many strengthening methods are available, in one embodiment, the strengthening may be accomplished by partially melting the portion of the header pipe that is opposite from the flanges, causing substantially equal forces from material shrinkage on each side.

Heat exchange tubes have been described as having substantially circular cross-sections. However, it should be appreciated that heat exchange tubes may take on a variety of different shapes. For example, heat exchange tubes may have substantially rectangular, or even square, cross-sections without departing from the spirit or the scope of the present invention. When heat exchange tubes have square cross-sections, leak areas between adjacent heat exchange tubes are essentially non-existent. As such, the pre-treatment of heat exchange tubes associated with thickening the ends of the heat exchange tubes may be eliminated.

Although the flanges on header pipes have effectively been described as being essentially uniform, it should be appreciated that the configuration of the flanges may generally be widely varied. In one embodiment, flanges may be arranged to be welded to the ends of heat exchange tubes. Such flanges may also be arranged with heat support edges which extend beyond the ends of the heat exchange tubes to provide additional support to welds between the flanges and the heat exchange tubes, as will be understood by those skilled in the art. Such flanges may generally include a portion which abuts against the ends of the heat exchange tubes, and a portion which contacts the sides of the heat exchange tubes.

Further, the process of pretreating, or otherwise preparing, the ends of heat exchange tubes may vary. Substantially any suitable process may be used without departing from the spirit or the scope of the present invention. For instance, the tube ends may be heated to cause the ends to substantially expand, e.g., increase in diameter. In one embodiment, the ends of the tubes may be extruded with draw down. As will be appreciated by those skilled in the art, "mechanical memory" built into the tubes allows the tubes, if heated close to their melting points, to substantially return to the original diameter of the extrusion die used in the process. By way of example, when a tube with a 0.25 inch diameter is extruded from a die with a 0.3 inch diameter, when reheated, the tube will generally expand to approximately 0.3 inches in diameter. For an associated forming process, the ends of the tubes may be heated such that the length of tube heated is approximately equivalent to one or two tube diameters. The ends may then be formed by constraining the expansion against each side, thereby causing squared tube ends, as well as eliminating leak areas between adjacent tubes. Alternatively, the ends may be formed by using air pressure to essentially expand the tube ends, then cutting, or otherwise trimming, the tube ends as desired. Finally, the very end of each tube may be cut such that the cut ends of the tubes have the desired shape without departing from the spirit or the scope of the present invention. Such a process may decrease the size and number of leak areas, without affecting the flow area associated with the header tubes.

While the present invention has been described in terms of heat exchange tubes which are formed from a thermoplastic material, it should be appreciated that the heat exchange tubes may be formed from a variety of different materials. By way of example, in some embodiments, heat exchange tubes may be formed from materials such as glass or metal without departing from the spirit or the scope of the present invention.

As described above with respect to FIGS. 6a and 6b, cap arrangements may be used to seal a header pipe to allow interconnection between a plurality of panels and to prevent creep in the header pipe. In general, however, many other mechanisms may instead be used to seal a header pipe. Such mechanisms may further be arranged to provide fluid flow to a header pipe and, hence, heat exchange tubes that are coupled to the header pipe. In one embodiment, a hose may be directly coupled to the header pipe to essentially seal the header pipe while allowing fluid to be provided to the header pipe.

Due to the fact that the method of coupling tubing to a header pipe as described above may be readily adapted for use with tubes of different diameters and lengths in a panel board, the method may also readily be adapted to couple separate tubes to a header pipe. In addition, the method may also be adapted to couple substantially any suitable array of tubes, woven or otherwise, to a header pipe without departing from the spirit or the scope of the present invention. Therefore, the present examples are to be considered as illustrative and not restrictive, and the invention is not to be limited to the details given herein, but may be modified within the scope of the appended claims.

I claim:

1. A method for forming a heat exchanging device, the device including a plurality of heat exchange tubes and a header pipe arrangement, wherein walls of each of the plurality of heat exchange tubes defines a tube opening within each of the heat exchange tubes and the header pipe arrangement defines dub-header openings in the header pipe arrangement, the method comprising:

pretreating ends of the heat exchange tubes;

applying heat to the pretreated ends of the heat exchange tubes, wherein applying heat to the pretreated ends of the heat exchange tubes at least partially melts the pretreated ends of the heat exchange tubes;

applying heat to the header pipe arrangement, the header pipe arrangement including a flange arrangement arranged around the sub-header openings, wherein applying heat to the header pipe arrangement at least partially melts the flange arrangement; and sealing the pretreated ends of the heat exchange tubes against the header pipe arrangement.

2. A method as recited in claim 1 wherein pretreating the ends of the heat exchange tubes includes:

melting the ends of the heat exchange tubes; and pressing the ends of the heat exchange tubes against a flat surface to thicken the ends of the heat exchange tubes, wherein thickening the ends of the heat exchange tubes preserves the integrity of the opening in each of the heat exchange tubes.

3. A method as recited in claim 2 wherein the plurality of heat exchange tubes is arranged as a panel board and adjacent heat exchange tubes selected from the plurality of heat exchange tubes define a leak area, wherein melting the ends of the heat exchange tubes at least partially fills the leak area.

4. A method as recited in claim 1 wherein applying heat to the header pipe arrangement includes applying infrared heat to the header pipe arrangement, and applying heat to the pretreated ends of the heat exchange tubes includes applying infrared heat to the pretreated ends of the heat exchange tubes.

5. A method as recited in claim 1 wherein sealing the pretreated ends of the heat exchange tubes against the header pipe arrangement includes:

aligning the opening in each heat exchange tube with a corresponding sub-header opening in the header pipe arrangement; and pressing the pretreated ends of the heat exchange tubes against the header pipe arrangement.

6. A method as recited in claim 1 further including:

sealing ends of the header pipe arrangement, wherein sealing ends of the header pipe arrangement includes sealing ends of the flange arrangement.

7. A method as recited in claim 1 wherein pretreating the ends of the heat exchange tubes includes:

melting the ends of the heat exchange tubes; and pressing the ends of the heat exchange tubes into a mold to thicken the ends of the heat exchange tubes, wherein thickening the ends of the heat exchange tubes preserves the integrity of the opening in each of the heat exchange tubes.

8. A method for coupling a plurality of tubes to a header, the header including flanges, the method comprising:

heating the flanges, wherein heating the flanges causes the flanges to at least partially melt;

heating an end of each tube selected from the plurality of tubes, wherein the end of each tube selected from the plurality of tubes causes the end of each tube selected from the plurality of tubes to at least partially melt; and pressing the heated end of each tube selected from the plurality of tubes against the flanges, wherein the heated end of each tube selected from the plurality of tubes is pressed between the flanges and is sealed between the flanges.

9. A method as recited in claim 8 further including thickening the end of each tube selected from the plurality of tubes before heating the end of each tube selected from the plurality of tubes.

10. A method as recited in claim 9 further including exposing the end of each tube selected from the plurality of tubes to heat before thickening the end of each tube selected from the plurality of tubes.

11. A method as recited in claim 10 wherein thickening the end of each tube selected from the plurality of tubes includes at least one selected from the group consisting of exposing the end of each tube selected from the plurality of tubes to hot air, pressing the end of each tube selected from the plurality of tubes against a hot platen, exposing the end of each tube selected from the plurality of tubes to infrared heat, and exposing the end of each tube to directed air pressure.

12. A method as recited in claim 10 wherein the end of each tube selected from the plurality of tubes is exposed to heat in the range of approximately 230 degrees Centigrade to approximately 240 degrees Centigrade for a duration in the range of approximately 10 seconds to approximately 20 seconds.

13. A method as recited in claim 9 further including cooling the thickened end of each tube selected from the plurality of tubes.

14. A method as recited in claim 8 wherein the header defines at least one sub-header opening, the sub-header opening being located between the flanges, the method further including connecting the sub-header opening with a tube opening in a first tube selected from the plurality of tubes.

* * * * *

UNITED STATES PATENT AND TRADEMARK OFFICE
CERTIFICATE OF CORRECTION

PATENT NO.   : 6,038,768
DATED        : March 21, 2000
INVENTOR(S)  : Rhodes

It is certified that error appears in the above-identified patent and that said Letters Patent are hereby corrected as shown below:

Column 7, line 58, change "ear" to --near--.

Column 7, line 60, change "ay" to --may--.

Column 9, line 39, change "he" to --the--.

In Claim 1, Column 12, line 66, change "dub-header" to --sub-header--.

In Claim 8, Column 14, line 9, insert --heat-- after "wherein".

Signed and Sealed this

Twenty-second Day of May, 2001

*Attest:*

NICHOLAS P. GODICI

*Attesting Officer*            Acting Director of the United States Patent and Trademark Office